(12) United States Patent
Kraft et al.

(10) Patent No.: US 7,892,431 B2
(45) Date of Patent: Feb. 22, 2011

(54) METHOD AND DEVICE FOR PURIFICATION OF EFFLUENT

(75) Inventors: Harald Kraft, Oberkirch-Nussbach (DE); Hans-Thomas Armbruster, Achem-Grossweier (DE); Wendelin Benz, Oberkirch-Zusenhofen (DE)

(73) Assignee: Papierfabrik August Koehler AG, Oberkirch (DE)

( * ) Notice: Subject to any disclaimer, the term of this patent is extended or adjusted under 35 U.S.C. 154(b) by 482 days.

(21) Appl. No.: 11/917,054

(22) PCT Filed: May 26, 2006

(86) PCT No.: PCT/EP2006/005062

§ 371 (c)(1),
(2), (4) Date: Jul. 14, 2008

(87) PCT Pub. No.: WO2006/131219

PCT Pub. Date: Dec. 14, 2006

(65) Prior Publication Data

US 2009/0211971 A1     Aug. 27, 2009

(30) Foreign Application Priority Data

Jun. 10, 2005  (DE) ................. 10 2005 026 878

(51) Int. Cl.
*C02F 3/00*  (2006.01)
(52) U.S. Cl. .................. 210/609; 210/619; 210/196; 210/209

(58) Field of Classification Search .............. 210/609, 210/619, 196, 209
See application file for complete search history.

(56) References Cited

U.S. PATENT DOCUMENTS

| 3,627,679 | A | * | 12/1971 | Fuller | ................ 210/711 |
| 6,071,380 | A | * | 6/2000 | Hoffman | ................ 162/190 |
| 2005/0023216 | A1 | | 2/2005 | Kraft et al. | |

FOREIGN PATENT DOCUMENTS

| JP | 2005193165 A | 7/2005 |
| JP | 20030181488 A | 7/2008 |

OTHER PUBLICATIONS

"English translation from WIPO of PCT International Preliminary Report on Patentability for PCT/EP2006/005062, from which the instant application is based," 7 pgs.

* cited by examiner

*Primary Examiner*—Chester T Barry
(74) *Attorney, Agent, or Firm*—Fredrikson & Byron, P.A.

(57) ABSTRACT

The invention relates to a method for the purification of effluent, in particular, effluent from the paper industry, comprising the following method steps: a) aerobic purification of the effluent using activated sludge in an activated sludge tank (1), b) settling of at least a part of the effluent/activated sludge mixture exiting the activated sludge tank (1) in a settling tank (2), c) separation of a part of the effluent/activated sludge mixture exiting the settling tank in a separating device (3) and d) recycling of at least a part of the activated sludge separated off in steps b) and/or c) into the activated sludge tank (1).

29 Claims, 6 Drawing Sheets

METHOD AND DEVICE FOR PURIFICATION OF EFFLUENT

RELATED APPLICATIONS

Figure 1:
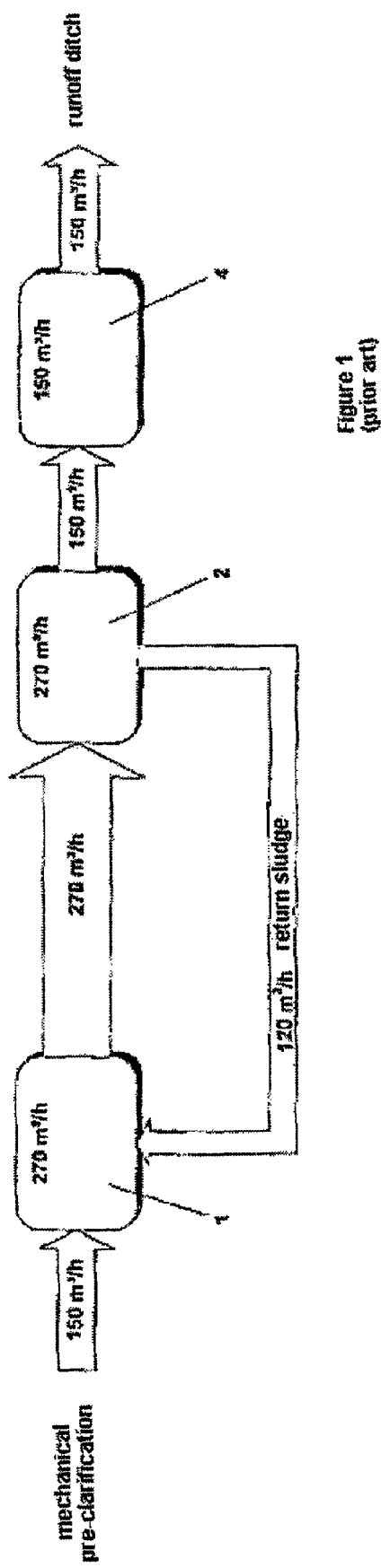

This application claims priority to International Application No. PCT/EPP2006/005062 filed May 26, 2006 and to German Patent Application No. 10 2005 026 878.1 filed Jun. 10, 2005, the teachings of which are incorporated herein by reference.

The invention relates to a method and a device for the purification of effluent, in particular, effluent resulting from the production of paper.

A device having the feature of the preamble of claim 15 is known from DE 101 48 474 A1.

Biological effluent-purification systems for purification of effluent generated in paper factories are widely used at present. Such systems generally have an aerobic activation stage as well as a settling stage. Adapted microorganisms are located in the activation stage as an activated sludge, which microorganisms break down the organic materials present in the effluent with consumption of oxygen. End products of these processes are normally carbon dioxide, water and biomass. In the settling tank, which is downstream-connected to the activation stage, a separation of the activated-sludge/water mixture takes place. Such a system is disclosed, for example, in the publication PTS-MS 10/94 "Operation of Biological Effluent-Purification Systems in Paper Factories, Monitoring, Controlling, and Optimizing" of the Papiertechnischen Stiftung, Heßstraße 134, D-80797 Munich.

An increasing of the hydraulic capacity of this known device and of this known method is achieved in the method and the device according to DE 101 48 474 A1 through the fact that, in addition to the settling, a portion of the effluent/activated-sludge mixture exiting the activation stage is dehydrated in a dehydration unit. The activated sludge precipitated in the settling and dehydration is here at least partially fed back into the activated-sludge tank. This known device and this known method are particularly, though not exclusively, suitable for rectangular tanks. Due to the concentration disparity prevalent in rectangular tanks, the control-technology expense in the known device and known method is relatively high.

The invention is based on the objective of specifying a method and a device for purification of effluent, in particular effluent from the paper industry, whereby the control-technology expense can be reduced.

With respect to the method, according to the invention this objective is accomplished through the object of claim 1, and with respect to the device, through the object of claim 15.

In contrast to the method and the device as known from DE 101 48 474 A1, the core of the invention consists in the fact that a portion of the activated sludge precipitated in the settling tank can be fed to the dehydration unit. For this purpose, it is planned according to claim 1 in step c) that a portion of the effluent/activated sludge mixture exiting the settling tank is dehydrated in a dehydration unit. Additionally, in the method according to the invention it is further planned that a portion of the activated sludge precipitated in the settling and/or in the dehydration unit is fed back into the activated-sludge tank.

With respect to the device, the core of the invention consists in the fact that activated sludge precipitated in the settling tank can be fed to the dehydration unit.

The invention has the advantage that it is especially well, although not exclusively, usable in a round tank, in which case the effluent feed can take place via a funnel in the center of the round tank, so that a large concentration disparity can be to a great extent avoided. The control-technology expense of the method and of the device according to the invention is correspondingly low.

A further simplification of the control can be achieved through the feeding, in step b), of the entire effluent/activated sludge mixture from the activated-sludge tank to the settling tank.

Alternatively, in step b) a portion of the effluent/activated sludge mixture can be fed from the activated-sludge tank to the settling tank and another portion of the effluent/activated sludge mixture can be fed from the activated-sludge tank to the dehydration unit. In this embodiment form of the invention, the method known from DE 101 48 474 A1 is combined with the method according to the invention, so that the hydraulic load can be reduced in connection with a tolerable control-technology expense.

As a dehydration unit, for example a decanter, a sedimentation system, or a concentration system can be used. According to an advantageous embodiment form of the invention, the dehydration unit displays a sieve-belt filter. The dehydration in step c) is thus carried out in a sieve-belt filter as the dehydration unit. The activated sludge precipitated from the sieve-belt dehydration contains significantly less water than the conventional activated sludge from the settling tank. The solid content in the activated sludge precipitated in the sieve-belt dehydration amounts to approximately 10 times that of the activated sludge from the settling tank. This means that the activated sludge fed back into the activation stage contains less water. The hydraulic load thus falls in comparison with a conventional settling, by the difference between the corresponding concentrations of the solids in the effluent/activated sludge mixture. From this results also an increased contact time of the effluent with the biomass in the activation stage. Consequently, with a constant dimension of the activation stage an increasing of the hydraulic load, i.e. the amount of fed effluent, is possible.

A sieve-belt filter is a matter of a sieve table above which an endless sieve belt is guided. For this purpose, two or more deflection rollers are present. The endless belt preferably consists of a synthetic mesh and displays a sieve structure. The dehydration process is effected by the sieve structure. The effluent/activated sludge mixture is brought onto the sieve table and dehydrated through the sieve, the concentrated sludge falling into a funnel for appropriate further processing. In order to aid the removal of the accumulating thickened sludge, the latter can, for example, be scraped off of the surface of the sieve belt. Mass that remains hanging in the sieve (and is not removed) can be removed from the sieve-belt mesh either through spray water that is sprayed out of the interior of the sieve-belt table or through compressed air. The use of compressed air is of particular advantage because a dilution effect for the activated-sludge system is thereby avoided, which effect can result from the use of spray water. The spray jets used for the cleaning of the sieve are preferably attached transversely to the sieve. The supplying of these jets can take place via either an external pump and/or via a partial stream of the clear filtrate, which is drawn off and separately discharged. The further conveyance of the filtered-out solid material takes place, for example, via a worm or in free fall, the sieve-cleaning water of the filter ensuring the necessary fluidity. The filtrate water is collected, for example, in a closed bottom of the sieve-belt dehydration unit and is discharged via a pipe.

Preferably, the effluent/activated sludge mixture exiting the activation stage is fed to the dehydration unit with a constant volume flow. Accordingly, in a corresponding device for the purification of effluent an apparatus for the constant conveyance of effluent/activated sludge mixture from the activation stage to the dehydration stage is present. This means that the dehydration unit is continuously supplied with a constant stream of effluent/activated sludge mixture from the activation stage. Thus, only the residual portion of the effluent/activated sludge mixture exiting the activation stage is introduced into the settling tank. Fluctuations in the effluent range can thus be equalized via the settling tank.

When, within the scope of the invention, a dehydration unit or a sieve-belt filter is spoken of, this is not meant in a restrictive manner. Thus, it is possible to divide the discharge from the activation stage not into two, but rather into three or more streams, of which two or more streams are fed to two or more dehydration units, in particular sieve-belt filters. Through this means, one activation stage can be used to supply several dehydration units, or vice versa.

For the transporting of the effluent/activated sludge mixture from the activation stage to the dehydration unit a centrifugal pump is preferably used. The centrifugal pump has the advantage of a constant conveying, i.e. that the effluent/activated sludge mixture is fed to the dehydration unit at a constant rate. A further advantage lies in the compact manner of construction of such pumps, due to which they have only a low space requirement.

According to a preferred embodiment form of the invention, the activation stage includes at least one, preferably approximately two to five rotating biological contactors. The aerobic clarifying thus takes place through the use of one or several rotating biological contactors. Such rotating biological contactors, which are also called rotating contactors, are constructed in essence as rotating plastic discs. The diameter of such rotating biological contactors generally lies between 2 and 5 m, and in the case of the use of several rotating biological contactors the spacing between these in each case is preferably approximately 15 to 20 mm. The discs rotate on a common shaft, the discs dipping into the water to be purified to approximately their halfway point. The biological decomposition of the organic matter takes place both on the surface of the rotating biological contactors and in the water phase in which the microorganisms become active. According to an alternative embodiment form, the activation tank can be designed as a rotating biological contactor or as a ventilated tank.

The purified effluent from the settling tank can, if necessary, be fed to an additionally filter system. For this purpose, in the device according to the invention a filter system is downstream-connected to the settling tank. The filter system serves the further purification or filtration of the biologically purified effluent. According to the desired degree of purity, different filters can be used therein for removal of superfine suspended matter. Preferably, the matter thereby filtered out is led back into the inflow for the activation. The water purified through the additional filter system can then be fed into the runoff ditch or collected in a clear-water tank for reuse.

The additional filter system preferably contains a double-layer filter. Double-layer filters are generally known and contain two layers, in each case one layer of a finer material and one layer of a coarser material, the coarser layer lying on top. The passing through of the water to be purified takes place from above to below, just as with the sieve-belt filter. Within given time intervals, whose duration depends on the degree of contamination as well as the flow rate, a usual backwashing takes place towards the filter purification. After this, the original layer structure is restored. Such a filtration in a double-layer filter can be advantageous or necessary when the discharge values from the settling and/or from the sieve-belt dehydration is not low enough to be able to feed the stream directly to the runoff ditch.

According to an advantageous embodiment form of the invention, the filter system is also connected to the dehydration unit via an outlet of the latter. The purified effluent from the dehydration unit can thus be fed entirely or partially to the additional filter system. Through this means, taking place in the filter system are both a final filtration of the purified effluent exiting the settling tank and a final filtration of the purified effluent exiting the dehydration unit.

According to the degree of contamination, a mechanical purification stage can be upstream-connected to the activation stage. Examples of such a mechanical purification stage are grids, pre-clarification tanks, or sieve-belt filters. The mentioned means of purification can be used either alone or in combination. Once again, in the case of the use of a sieve-belt filter a constant partial-stream treatment is advisable, while in the pre-clarification tank a variable partial-stream treatment can take place. In order to absorb intermittently increased effluent amounts, the use of a buffer tank has proved advantageous. In order to prevent putrefaction, an oxidation agent can be added already in the mechanical purification stage.

The consistency of the sludge thickened with the aid of the dehydration unit or, more precisely, the sieve-belt filter can be influenced though the addition of flocculating agents. For this purpose, a metering apparatus is preferably arranged in the dehydration unit for the addition of flocculating agents. The metering apparatus can be arranged, for example, in the pipe between the apparatus for conveying the effluent/activated sludge mixture, or more precisely the centrifugal pump, and the dehydration unit, or more precisely the sieve-belt filter. The metering apparatus is preferably designed so that a forced mixing of the introduced flocculating agent with the effluent/activated sludge mixture occurs. This can be achieved, for example, through tangential entry and exit of the effluent/activated sludge mixture. The metering apparatus can be, for example, a suitable pump. In addition, the intensity of the inter-mixing can be influenced through special fittings, as for example vortex regions, static mixers, or rotor/stator systems.

The treatment of the effluent/activated sludge mixture in the dehydration unit is preferably regulated in an automatic manner. For this purpose, an appropriate measurement apparatus is downstream-connected to the dehydration unit for measuring the solid content of the purified effluent. Also present is a control unit that controls the metering apparatus in dependence on the solid content as measured in the measurement apparatus. An example of a measurement apparatus is a turbidity/solid probe. As an alternative, UV spectroscopy can also be used. If the solid content in the filtrate water rises, then a signal is triggered at the control unit, through which the conveying power of the metering apparatus, for examples a flocculating agent pump, is incrementally increased. For example, the control can be set so that the setting persists in each case for approximately 10 minutes after targeted filtrate quality is attained. After the end of the 10 minutes, the metering apparatus is again incrementally cut back. Other time intervals, for example in a range of 5 to 15 minutes, in particular in a range of 8 to 12 minutes, are also possible.

In addition to the adding of flocculating agents, the consistency of the thickened sludge can also be influenced through the sieving rate. Consequently, there exists a further possibility for controlling the method according to the invention. A further option for ensuring the desired content of cloudy matter in the filtrate water consists in the possibility of varying the feed pump within its limits in association with the above-mentioned metering apparatus. If an increased content of solids is measured in the filtrate water by the measuring apparatus, then a signal is triggered at the device for conveying, or more precisely the centrifugal pump, which is thereupon cut back. The feed amount of the effluent/activated sludge mixture is incrementally reduced in this manner. This type of regulation can be used alone or in combination with the first-mentioned control mechanism.

A possibility of the combined regulation lies, for example, in first increasing the conveying power of the flocculating-agent metering apparatus with a high cloudy-matter content in purified effluent. Upon the achieving of the optimized conveying power and, in addition, with a high cloudy-matter content in purified effluent, a reduction of the flocculating-agent feed to the dehydration unit takes place. The regulation can be designed such that upon the attaining of 40% to 60%, in particular 50%, of the maximum conveying power of the apparatus for conveying, with simultaneous optimization of the flocculating-agent input, the dehydration process is interrupted after 10 to 30 minutes, in particular after 20 minutes, so that the system can be manually reset. Other limit values with respect to the conveying power and other time intervals are also possible.

Preferably, the activated sludge precipitated in the settling tank contains a concentration of solids of approximately 2 g/l to approximately 10 g/l, in particular approximately 2.5 g/l to approximately 7 g/l, and more particularly approximately 4 g/l to approximately 5.5 g/l. Higher concentrations of solids in the activated sludge can be achieved by means of a settling tank only with difficulty. In addition, when these values are fallen below or exceeded, disadvantages arise that lead to impairment of the system.

In contrast, the activated sludge in the dehydration unit contains solids in a concentration of approximately 30 g/l to 80 g/l, in particular approximately 35 g/l to 55 g/l. Thus the concentration of solids in the activated sludge in the dehydration unit, for example a sieve-belt press, is increased by approximately a factor of 10 in comparison with that from the settling tank.

In the following, the invention is described in detail with the aid of an embodiment example and with reference to the accompanying schematic drawings.

Figure 2:
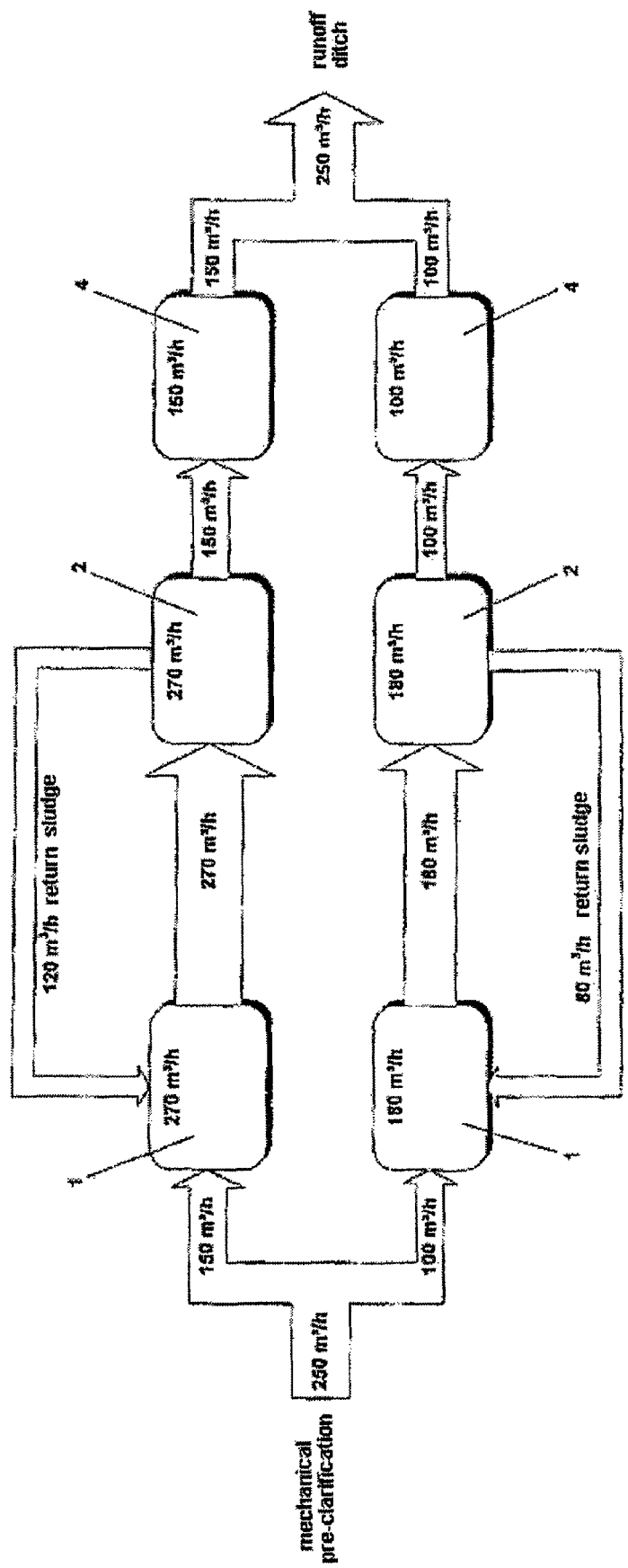
Figure 3:
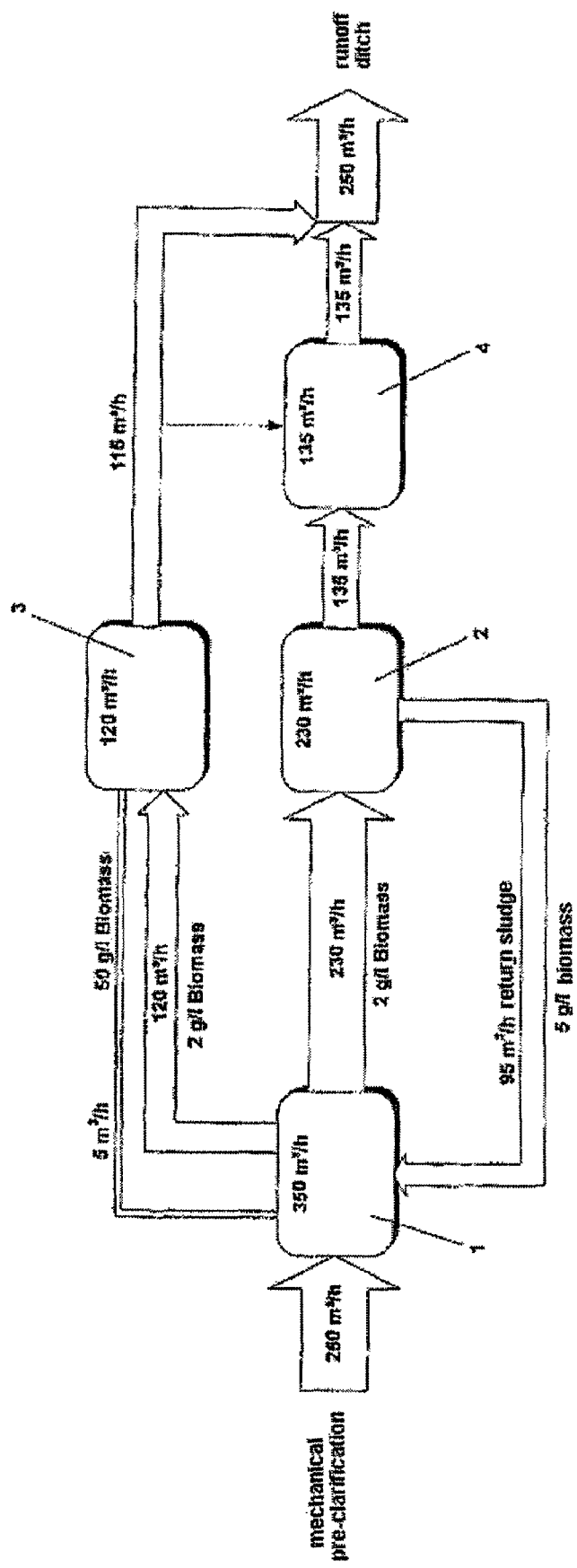
Figure 4:
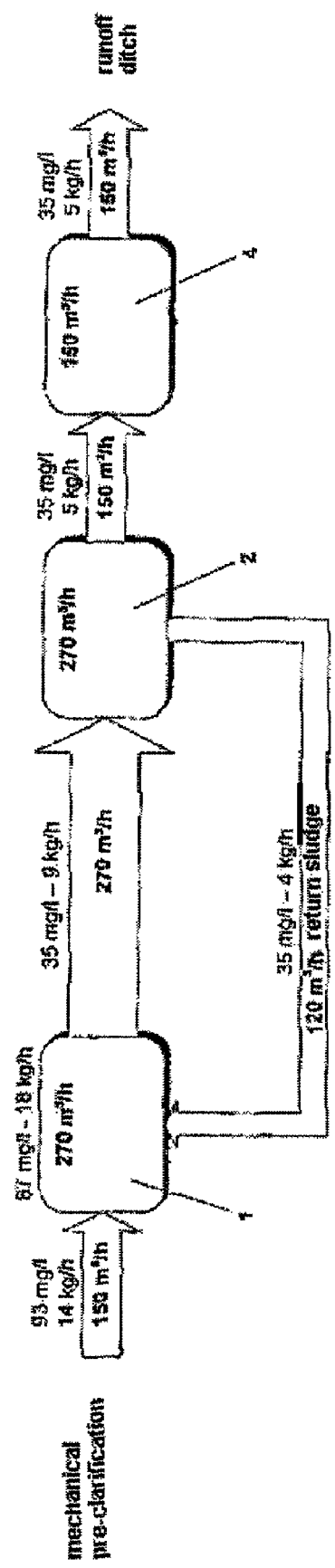
Figure 5:
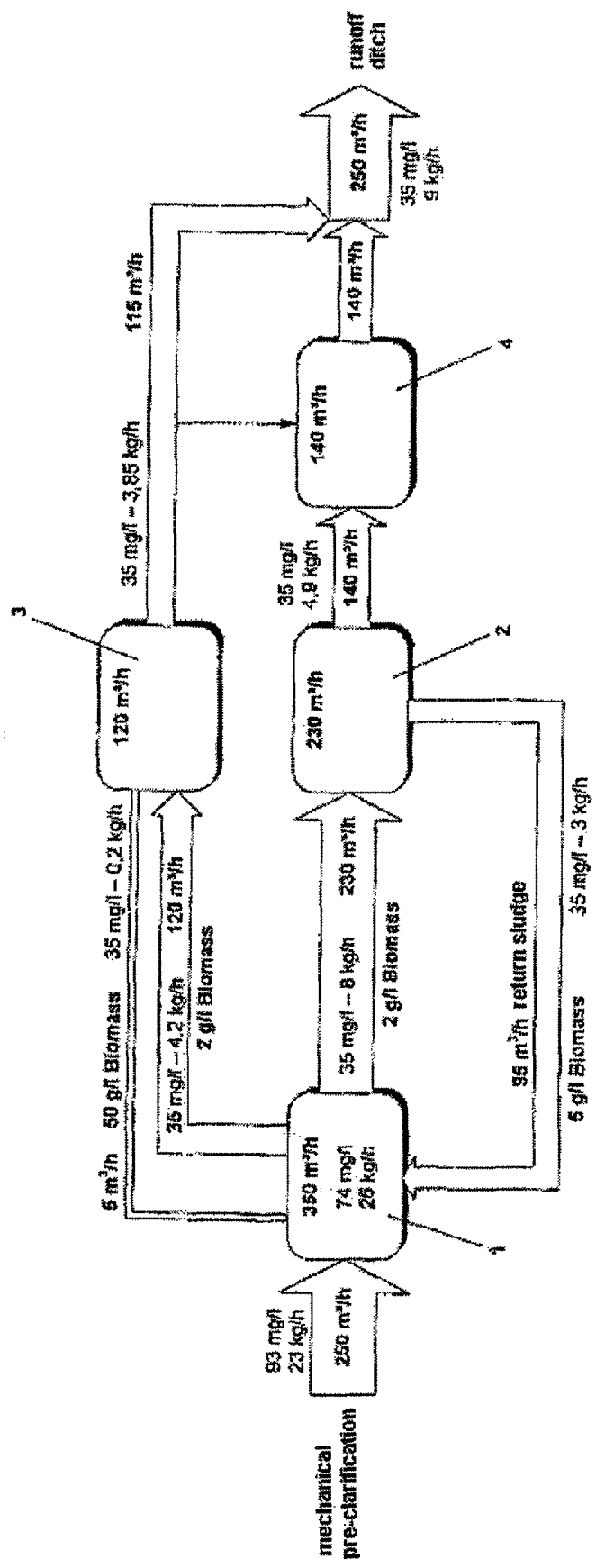
Figure 6:
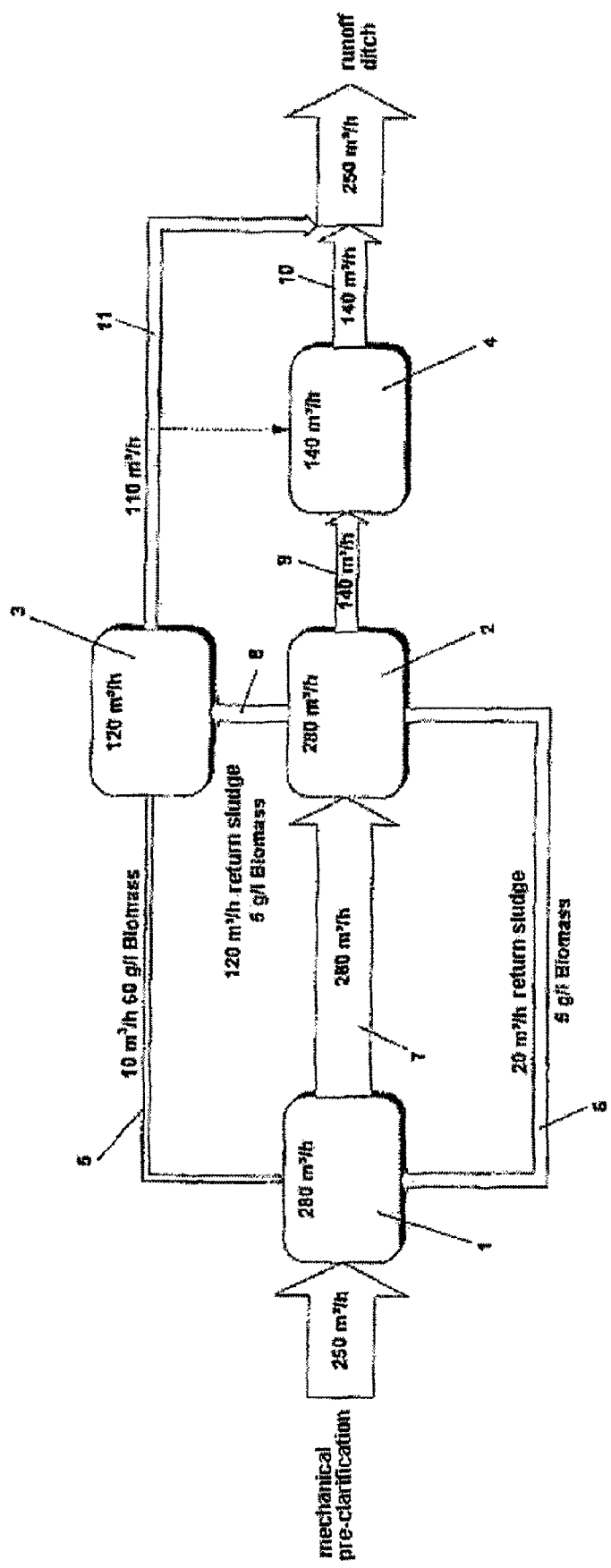

In the drawings:

FIG. 1: shows the flow diagram of an effluent purification system for the paper industry according to the prior art;

FIG. 2: shows an expansion of a system according to FIG. 1 that is used for increasing the capacity in the conventional manner;

FIG. 3: shows the flow diagram of a further effluent purification system according to the prior art;

FIG. 4: shows the effluent purification system according to FIG. 1 with consideration of the biological load;

FIG. 5: shows the effluent purification system according to FIG. 3 with consideration of the biological load; and FIG. 6: shows the flow diagram of an embodiment example of a device and process according to the invention.

For better background understanding of the invention, the known systems according to FIGS. 1, 2, and 4 as well as the known, improved system according to FIGS. 3 and 5 are explained in detail. The system or invention according to the invention shown in FIG. 6 will be returned to later. It is pointed out already here that the disclosed methods can be combined with the method according to the invention or with the device according to the invention.

In FIG. 1, labeled generally with reference numeral 1 is an activation stage or more precisely an activated-sludge tank. In the case of an upstream-connected trickling filter, the feed of the latter takes place by means of speed-regulated pumps. The regulating of the feed of the trickling filter preferably occurs, if a second biostage is downstream-connected to the trickling filter, in dependence on the oxygen content of the second biostage. If the biological decomposition stage contains rotating biological contactors, then it is preferably a matter of several, for example four, series-connected rotating biological contactors with speed-regulated drive. Preferably, in each case after the second and fourth rotating biological contactors oxygen measurements take place, which measurements are used for regulating the rotational speed of the rotating biological contactors. As is customary, a metered addition of nutrient-salt solution, should this prove to be necessary, takes place preferably in the input to the activation stage.

According to the prior art, the overflow from the activation stage 1 enters in its entirety a settling tank 2. In the settling tank 2, a separation of the activated sludge/effluent mixture into clear, largely solid-free water and activated sludge takes place. In addition, a retention, thickening, and storage of the activated sludge takes place. Typical embodiment forms of a settling tank are rectangular tanks and round tanks. The precipitated activated sludge is fed again to the activation stage via a return conduit. For example, sludge scrapers or suction chambers, which latter operate according to the lever principle, can be used for this purpose. The sludge feedback can occur continuously or at intervals.

In this embodiment example, the filtrated water exiting the settling tank is fed to an optional additional filtration stage, for example a double-layer filter, which is labeled here with reference numeral 4. Here, the even the finest solid particles as well as biosludge-particle aggregates up to a size of approximately 1 to 5 millimeters can be filtered out. The purified water exiting this filter can subsequently be either collected in a clear-water tank or directly discharged into the runoff ditch.

An example of the possible design of the system shown in FIG. 1 (according to the prior art) is given in the following:

| Activation Stage: | effluent inflow: | 150 m³/h |
|---|---|---|
| | volume: | 350 m³ |
| | dwell time: | 2.33 hr (quotient of volume 350 m³ and effluent inflow 150 m³/hr = 2.33 hr) |
| Settling Tank: | settling tank surface: | 198 m² |
| | settling tank volume: | 653 m³ |
| | settling tank surface-loading rate: | 0.76 m/hr (quotient of effluent inflow 150 m³/hr and settling tank surface 198 m² = 0.76 m/hr) |
| | dwell time: | 4.35 hr (quotient of settling tank volume 653 m³ and effluent inflow 150 m³/hr) |

The above data were derived theoretically. If one takes into consideration the actual operating circumstances, i.e. the feeding back of the activated sludge from the settling tank 2 into the activation stage 1, then the following conditions result:

| Activation Stretch: | effluent inflow including return: | 270 m³/h |
|---|---|---|
| | volume: | 350 m³ |
| | actual dwell time: | 1.30 hr |
| Settling Tank: | settling tank surface: | 198 m² |
| | settling tank volume: | 653 m³ |
| | sludge return: | 120 m³/h |
| | actual surface-loading rate: | 1.36 m/hr |
| | actual dwell time: | 2.42 hr |

In this comparison, it becomes clear that substantial hydraulic system parameters are disregarded in the usual system dimensioning when the fed-back activated sludge is not taken into consideration.

FIG. 2 shows the usual expansion, according to the prior art, of the system of FIG. 1 when an additional amount of effluent is to be processed. In FIG. 2, elements corresponding to those of the embodiment form of FIG. 1 are assigned the same reference numerals. If, for example, an increased inflow amount of 100 m$^3$/hr is to be handled, and maintaining the generally customary boundary conditions and the above-specified system parameters, then an additional settling tank must be built. However, this has the consequence that the effective dwell time or contact time with an equal size activation stage is reduced by approximately 50%. Due to the shorter contact time, in addition an expansion of the activation stage would be necessary, as is explained in detail below. In general, however, in expansion of the activation stage makes sense only when this is biologically overloaded. Rather, if only the effluent amount is increased, while the content of substrate in the effluent is lower, then the hydraulic load of the system should be reduced.

For the system shown in FIG. 2, the following data result when the inflow amount is increased by 100 m$^3$/hr:

| Activation Stretch: | effluent inflow: | 250 m$^3$/h (sum of 150 + 100 m$^3$/h) |
|---|---|---|
| | effluent sludge return: | 200 m$^3$/h (sum of 120 + 80 m$^3$/h) |
| | activation tank volume: | 350 m$^3$ |
| | actual dwell time: | 0.78 hr (quotient of activation tank volume 350 m$^3$ and sum of effluent inflow to the settling tank: 270 + 180 m$^3$/h = 450 m$^3$/hr) |

Thus, in order to achieve the dwell time of 1.30 hr calculated in connection with FIG. 1, the activation stage must be expanded by 67% (from 0.78 hr to 1.30 hr).

Thus resulting in the following conditions in the settling tank:

| Settling Tank: | settling tank surface: | 1 × 198 m$^2$ plus 1 × 133 m$^2$ |
|---|---|---|
| | settling tank volume: | 1 × 653 m$^3$ plus 1 × 436 m$^3$ |
| | effluent amount: | 250 m$^3$/hr |
| | sludge return: | 200 m$^3$/hr |
| | actual surface-loading rate: | 1.36 m/hr (quotient of the sum of the effluent inflow 250 m$^3$/hr plus the sludge return 120 + 80 m$^3$/hr and the sum of the settling tank surfaces 198 + 133 = 331 m$^2$) |
| | actual dwell time: | 2.42 hr (quotient of the settling tank volume 653 m$^3$ and the effluent inflow including return 270 m$^3$/hr) |

Such an extension of an existing system is associated with a large expenditure of time. In addition, a large financial investment is required. Through the necessary expansion of the activation stage by nearly 70%, there further arises a disproportionately high space requirement. The flexibility of the system with respect to the effluent content materials (concentration of the effluent content materials) is limited in the case of such a conventional expansion. In other words, if the effluent becomes "thinner" or "thicker", a considerable deterioration of the overall functioning of the system results.

Represented in FIG. 3 is an alternative to the shown conventional expansion, which alternative is known from DE 101 48 474 A1. The method has the following process steps: a) aerobic clarifying of the effluent through activated sludge in an activation stage; b) settling in a settling tank of a portion of the effluent/activated sludge mixture exiting the activation stage; c) dehydration in a dehydration unit of another portion of the effluent/activated sludge mixture exiting the activation stage; d) feeding back of at least a portion of the activated sludge precipitated in steps b) and c) into the activated-sludge tank.

A corresponding device displays an activation stage for the aerobic clarifying of the effluent, a settling tank for solid/liquid separation as well as a dehydration unit for the sludge dehydration, both the settling tank and the dehydration unit being connected with the activation stage via, in each dcase, at least two pipe systems. In each case, one pipe leads from the outlet of the activation stage to the settling tank or to the dehydration unit, as the case may be, and serves the feeding of the effluent/activated sludge mixture. In each case, an additional pipe serves the feedback into the activation stage of the activated sludge, having been thickened in the settling tank or in the dehydration unit, as the case may be.

Through the feedback of the sludge from the dehydration unit and from the settling tank, the biomass required for the activation system is supplied again, so that the aerobic system in the activation is stabilized. In particular, through the feedback of the sludge a deterioration of the effluent purification through biosludge losses is avoided or minimized.

The first stage, namely the aerobic clarification of the effluent in an activation stage by means of activated sludge, corresponds to that of the prior art according to FIG. 1. However, in contrast to the prior art according to FIG. 1, not all of the biosludge/water mixture running off from the activation stage is fed to the settling tank, but rather only a portion of it. The other portion is dehydrated in a dehydration unit in a parallel process step. In this, the resulting thickened biosludge from both the settling tank and the dehydration unit is fed back. The purified water that exits the settling tank and the dehydration unit can then be conducted, directly or via a filter purification stage, into a runoff ditch. Through the method according to FIGS. 3 and 5, the hydraulic load of the activation stage and of the settling is reduced to a minimum.

In particular, subsequent to an activation stage 1, the exiting effluent stream is divided into two partial streams, of which the first stream, as usual hitherto, is fed to a settling tank 2, whereas the second partial stream is fed to a dehydration unit 3, for example a sieve-belt filter. The separated activated sludge is fed back again into the activation stage 1 from both the settling tank 2 and the dehydration unit 3. Downstream-connected to the settling tank is an additional filter system 4, for example a double-layer filter, which is fed by the discharge of the settling tank 2 and, optionally, also from the discharge of the dehydration unit 3 (dashed line). However, the water exiting the dehydration unit 3 can, in the case of appropriate cleanliness, also bypass the secondary filtration stage 4 and be directly combined with the purified effluent exiting the filter system 4, and subsequently discharged into the runoff ditch.

For a corresponding effluent feed of 250 m$^3$/hr (which corresponds to the conditions in the embodiment form according to the prior art of FIG. 2) the following parameters result in the case of the embodiment according to the invention:

| Activation Stage: | effluent inflow: | 250 m³/h |
| --- | --- | --- |
| | sludge return: | 95 m³/hr |
| | return from the dehydration unit: | 5 m³/hr |
| | volume: | 350 m³ |
| | actual dwell time: | 1.00 hr (quotient of activation tank volume 350 m³ and the sum of the effluent inflow 250 m³/hr plus the sludge return 95 + 5 m³/hr). |

In order to achieve an actual dwell time corresponding to the original starting situation, the activation stage must here be expanded by about 30%. This results in the following conditions for the settling tank:

| Settling Tank: | settling tank surface: | 198 m² |
| --- | --- | --- |
| | settling tank volume: | 653 m³ |
| | sludge return including dehydration unit: | 95 m³/hr (sum of 90 + 5 m³/hr) |
| | effluent amount (inflow into the settling tank): | 230 m³/hr |
| | actual surface-loading rate: | 1.16 m/hr (quotient of the effluent 230 m³ and the settling tank surface 198 m²) |
| | actual dwell time: | 2.61 hr (quotient of the settling tank volume 653 m³ and the effluent amount 250 m³/hr) |

In this manner, under actual operating conditions no expansion of the settling tank is necessary with reference to the dwell time.

From the embodiment example shown, it becomes evident that in order to handle, in the conventional manner, an additional amount of 100 m³/hr of effluent to be purified an expansion of the settling system by an additional settling tank is necessary. In the traditional embodiment example shown in connection with FIG. 2, the settling system is to be expanded by approximately 70%, maintaining the essential system parameters. In contrast, with application of the device according to the invention the activation stage need only be expanded by about 30%. This leads in practice to cost savings of approximately 80%. In addition, the hydraulic load falls by over 90% in comparison with a conventional settling, as shown in connection with FIG. 2. An additional economic advantage lies in the fact that the conventional design, due to the necessary great expansion of the activation stage, results in an increased space requirement. In contrast, with the device according to the present invention only a much smaller additional area is necessary for the activation stage. As is evident from FIGS. 1 and 3, for the retrofitting of an existing system into a device according to the invention only a few additional elements are necessary, and thus the expansion can take place quickly.

FIG. 4 shows the conditions of the biological load in the case of the effluent-purification system according to the prior art as represented in FIG. 1. The system shown is designed for a biological load of 560 kg COD per day, corresponding to 23 kg/hr. To be understood here by the COD load is the chemical oxygen demand, which represents a parameter for the summary assessment of the oxidizable contents of an effluent. The standardized method for determining this parameter is known to the specialist in the field of wastewater technology and for that reason shall not be explained in detail here. In the inflow to the activation the COD loading amounts to 93 mg/l, which in the case of an inflow of 150 m³/hr corresponds to a loading of 14 kg/hr. The return sludge contains a loading of 35 mg/l, which in the case of a return amount of 120 m³/hr corresponds to a loading of 4 kg/hr. From this results a biological loading for the activation stage of 67 mg/l, which in the case of an overall inflow of 270 m³/hr corresponds to a loading of 18 kg/hr, while the purified effluent exiting the settling has a loading of 35 mg/l, which in the case of a water amount of 150 m³/hr corresponds to a loading of 5.3 kg/hr.

Represented in FIG. 5 are the conditions with regard to the biological loading in the case of a system as shown in FIG. 3. The biological loading in the inflow to the activation stage amounts likewise to 93 mg/l, which due to the increased inflow amount of 250 m³/hr corresponds here to a biological loading of 23 kg/hr. In the return sludge a COD loading of 35 mg/l is to be recorded, which in the case of a conveyed return-sludge amount of 95 m³/hr corresponds to a loading of 3 kg/hr. In addition, in this case there is the biological loading of the return sludge from the sieve band dehydration of 35 mg/l, which in the case of an amount of 5 m³/hr corresponds to a loading of 0.4 kg/hr.

Resulting from this are the following values for the biological loading of the individual stages:

| Activation stage: | 74 mg/l; with a total effluent amount of 350 m³/hr, this corresponds to a value of 26 kg/hr; |
| --- | --- |
| Settling: | 35 mg/l; with an effluent throughput of 230 m³/hr, this corresponds to a loading of 5 kg/hr; |
| Sieve-belt dehydration: | 35 mg/l; with an overall throughput of 120 m³/hr, this corresponds to a loading of 4 kg/hr; |
| Runoff ditch: | 35 mg/l; with a water amount of 250 m³/hr, this corresponds to a loading of 8.8 kg/hr. |

These examples show that it is possible, with the inflow concentration remaining constant (COD loading in the effluent), to optimally utilize with respect to its biological capacity the effluent-purification system expanded according to the invention. Due to the increased hydraulic efficiency, an optimal provision of substrate is possible without the necessity of a targeted increase of the inflow concentration (the adding of, for example, starch).

The flow diagram of a device according to the invention and of a method according to the invention is represented in FIG. 6.

The system according to FIG. 6 comprises an activated-sludge tank 1, a settling tank 2, a dehydration unit 3, and a filter system 4. In this system, it is essential that the settling tank 2 and the dehydration unit 3 are hydraulically connected to each other, so that the activated sludge or the return sludge that is precipitated in the settling tank 2 can be fed to the dehydration unit 3. In this sense, the dehydration unit 3 is downstream-connected to the settling tank 2, or to speak more generally, a dehydration stage is downstream-connected to a settling stage. The dehydration unit can, for example, be a device with the name Turbodrain TD3. For the rest, the arrangement of the activated-sludge tank 1, the settling tank 2, the dehydration unit 3 and the filter system 4 already described in connection with the known device and method according to FIGS. 1 to 5 can be used in the device and method according to the invention.

The system schematically represented in the flow diagram according to FIG. 6 is constructed in detail as follows or is described as follows. An effluent stream is fed to the activated-sludge tank 1 from the mechanical pre-clarification. The activated-sludge tank 1 includes in addition a feed pipe 5 for the feeding of return sludge from the dehydration unit 3 as well as a further feed pipe 6 for return sludge that is precipitated in the settling tank 2. The activated-sludge tank 1 further includes a drainage pipe 7 that connects the activated-sludge tank 1 to the settling tank 2.

The settling tank 2 is preferably formed as a round tank, while the effluent feed via the pipe 7 into the settling tank 2 takes place through a funnel arranged centrally in the settling tank 2.

The settling tank 2 includes a drainage pipe 8 that connects the settling tank 2 to the dehydration unit 3, so that the return sludge can be fed from the settling tank 2 to the dehydration unit 3 via the drainage pipe 8. The settling tank 2 is connected to a further pipe, namely the inflow pipe 6 leading to the activated-sludge tank 1, so that return sludge can be fed from the settling tank 2 to the activated-sludge tank 1.

A further drainage pipe 9 connects the settling tank 2 to the filter system 4.

It is clear that the drainage pipes 6, 8 and 9 of the settling tank 2 represent the respective feed pipes for the, in each case, downstream-connected tanks 1, 4 and the unit 3.

The filter system 4, which can include a double-layer filter, is connected to the runoff ditch via the pipe 10.

The dehydration unit 3 includes an inflow, namely the drainage pipe 8 of the settling tank 2, as well as two drainages, namely the pipe 5, which leads to the activated-sludge tank 1, as well as an additional pipe 11, through which the purified water is conducted from the dehydration unit 3 into the pipe 10 that leads to the runoff ditch.

The above-described system as well as the above-described method make possible the feeding back of activated sludge from both the dehydration unit 3 (through the pipe 5) and the settling tank 2 (through the pipe 6) to the activated-sludge tank 1. In addition, a hydraulic connection exists between the settling tank 2 and the dehydration unit 3, so that a portion of the activated sludge precipitated in the settling tank 2 is fed to the activated-sludge tank 1 via the dehydration unit 3, liquid being extracted from the activated sludge in the dehydration unit 3, which liquid is fed to the runoff ditch via the pipe 11 as purified effluent.

FIG. 6 specifies the volume flow rates as well as the concentrations of the biomass that can, for example, be used in the operation of the system according to FIG. 6.

Furthermore, it is also possible to combine the device according to FIG. 6 with the device according to FIG. 5. This means that in the device according to FIG. 5 a connecting pipe is provided between the settling tank 2 and the dehydration unit 3, so that activated sludge can be fed from the settling tank 2 to the dehydration unit 3. The dehydration unit 3 would thus be supplied with the effluent/activated sludge mixture via two feed pipes, one from the settling tank 2 and one from the activated-sludge tank 1.

The invention claimed is:

1. A method for purification of effluent, in particular effluent from the paper industry, comprising the following process steps:
   a) aerobic clarification of the effluent through activated sludge in an activated-sludge tank;
   b) settling of at least a portion of the effluent/activated-sludge mixture exiting the activated-sludge tank in a settling tank;
   c) dehydrating in a dehydration unit a portion of the effluent/activated-sludge mixture exiting the settling tank and a portion of the activated sludge settled in the settling tank;
   d) feeding back at least a portion of the activated sludge settled in either or both steps b) and c) into the activated-sludge tank.

2. A method according to claim 1, wherein step b) comprises feeding the entire effluent/activated-sludge mixture from the activated-sludge tank to the settling tank.

3. A method according to claim 1, wherein step b) comprises feeding a portion of the effluent/activated-sludge mixture from the activated-sludge tank to the settling tank and feeding a further portion of the effluent/activated-sludge mixture from the activated-sludge tank to the dehydration unit.

4. A method according to claim 1, further comprising the step of feeding effluent that has been purified in the settling tank to a filter system.

5. A method according to claim 4, further comprising the step of feeding the purified effluent from the dehydration unit at least partially to the filter system.

6. A method according to claim 4, further comprising the step of feeding the purified effluent from the settling tank to a double-layer filter as the filter system.

7. A method according to claim 1, wherein the dehydrating step c) takes place using of a sieve-belt filter as the dehydration unit.

8. A method according to claim 3, wherein the effluent/activated-sludge mixture exiting the activated-sludge tank and/or the settling tank is fed to the dehydration unit at a constant volume flow.

9. A method according to claim 1, wherein the aerobic clarifying step a) takes place using at least one rotating biological contactor.

10. A method according to claim 1, wherein the activated sludge settled in step b) is fed back into the activated-sludge tank at a concentration of approximately 2 g/l to approximately 10 g/l.

11. A method according to claim 10, wherein the activated sludge settled in step b) is fed back into the activated-sludge tank at a concentration of approximately 2.5 g/l to approximately 7 g/l.

12. A method according to claim 10, wherein the activated sludge settled in step b) is fed back into the activated-sludge tank at a concentration of approximately 4 g/l to approximately 5.5 g/l.

13. A method according to claim 1, wherein the activated sludge settled in step c) is fed back into the activated-sludge tank at a concentration of approximately 30 g/l to approximately 80 g/l.

14. A method according to claim 13, wherein the activated sludge settled in step c) is fed back into the activated-sludge tank at a concentration of 35 g/l to 55 g/l.

15. A method according to claim 1, wherein the activated sludge settled in step b) is fed to the dehydration unit at a concentration of approximately 2 g/l to approximately 10 g/l.

16. A method according to claim 1, wherein the activated sludge settled in step b) is fed to the dehydration unit at a concentration of approximately 2.5 g/l to approximately 7 g/l.

17. A method according to claim 1, wherein the activated sludge settled in step b) is fed to the dehydration unit at a concentration of approximately 4 g/l to approximately 5.5 g/l.

18. A device for the purification of effluent, in particular effluent from the paper industry, comprising:
   an activated-sludge tank to receive a mixture of activated sludge and effluent for the aerobic clarification of the effluent;
   a settling tank for solid/liquid separation of the activated-sludge/effluent mixture; and
   a dehydration unit for dehydration of the effluent/activated-sludge mixture and of the activated sludge, wherein the settling tank and the dehydration unit are hydraulically coupled so that either or both the effluent/activated-sludge mixture from the activated-sludge tank and from the settling tank as well as the activated sludge settled in the settling tank can be fed to the dehydration unit.

19. A device according to claim 18, wherein the dehydration unit is a sieve-belt filter.

20. A device according to claim 18, further comprising an device for constant conveyance of the effluent/activated-sludge mixture from the activated-sludge tank to the dehydration unit.

21. A device according to claim 20, wherein the device for constant conveyance includes a centrifugal pump.

22. A device according to claim 18, further comprising at least one rotating biological contactor assigned to the activated-sludge tank.

23. A device according to claim 18, further comprising a filter system coupled downstream of the settling tank.

24. A device according to claim 23, wherein the filter system includes a double-layer filter.

25. A device according to claim 23, wherein the dehydration unit includes a drain outlet coupled to the filter system.

26. A device according to claim 18, further comprising a mechanical purification stage coupled upstream of the activated-sludge tank.

27. A device according to claim 18, further comprising a metering and adding device coupled upstream of the dehydration unit for the purpose of adding of flocculating agents.

28. A device according to claim 22, further comprising a measuring device coupled downstream of the dehydration unit for the purpose of measuring the cloudy-matter content of the purified effluent, and further comprising a control unit for controlling the metering device in dependence on the cloudy-matter content measured by the measuring device.

29. A device according to claim 18, wherein the dehydration unit and the settling tank are in each case coupled via a feedback conduit to the activated-sludge tank for the feeding back of activated sludge.

* * * * *